US012443946B2

(12) United States Patent
Higgins (10) Patent No.: US 12,443,946 B2
(45) Date of Patent: *Oct. 14, 2025

(54) METHOD AND SYSTEM FOR ENABLING TRACEABLE PRIVACY-MAINTAINING MULTI-HOP OFFLINE TRANSACTIONS IN DIGITAL CURRENCIES

(71) Applicant: Mastercard International Incorporated, Purchase, NY (US)

(72) Inventor: Stephen Higgins, Dublin (IE)

(73) Assignee: MASTERCARD INTERATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,114

(22) Filed: Jan. 2, 2024

(65) Prior Publication Data

US 2024/0135368 A1 Apr. 25, 2024

Related U.S. Application Data

(63) Continuation of application No. 17/550,596, filed on Dec. 14, 2021, now Pat. No. 11,900,367.

(51) Int. Cl.
*G06Q 20/00* (2012.01)
*G06Q 20/38* (2012.01)
*G06Q 20/40* (2012.01)

(52) U.S. Cl.
CPC ..... *G06Q 20/3825* (2013.01); *G06Q 20/38215* (2013.01); *G06Q 20/3829* (2013.01); *G06Q 20/4014* (2013.01); *G06Q 20/409* (2013.01)

(58) Field of Classification Search
CPC ......... G06Q 20/3825; G06Q 20/38215; G06Q 20/3829; G06Q 20/4014; G06Q 20/409;
(Continued)

(56) References Cited

U.S. PATENT DOCUMENTS 10,990,935 B1 4/2021 Hayes
2010/0241595 A1* 9/2010 Felsher ................. G16H 10/65
707/E17.014

(Continued)

FOREIGN PATENT DOCUMENTS

WO 2017139060 A1 8/2017

OTHER PUBLICATIONS

International Search Report dated Mar. 2, 2023, corresponding to PCT/2022/051795 (12 Pages).

(Continued)

*Primary Examiner* — Dante Ravetti
(74) *Attorney, Agent, or Firm* — Panitch Schwarze Belisario & Nadel LLP (57) ABSTRACT

A method for processing offline cryptocurrency transfers includes: receiving, by a receiver of a computing device, a first transfer message, wherein the first transfer message is cryptographically signed using a first private key of a first key pair; validating, by a processor of the computing device, the cryptographic signature of the first transfer message using a first public key of the first key pair; storing, in a memory of the computing device, the validated first transfer message; receiving, by an input device of the computing device, a transfer instruction, the transfer instruction including at least a communication address; and electronically transmitting, by a transmitter of the computing device, the validated first transfer message to an external device based on at least the communication address.

14 Claims, 6 Drawing Sheets

(58) Field of Classification Search
CPC ...... G06Q 20/223; G06Q 20/32; G06Q 20/36; G06Q 20/389; G06Q 20/065; H04L 9/0819; H04L 9/3247; H04L 9/50
See application file for complete search history.

(56) References Cited

U.S. PATENT DOCUMENTS

| | | |
|---|---|---|
| 2019/0095907 A1 | 3/2019 | Govindarajan et al. |
| 2021/0012331 A1 | 1/2021 | Higgins |
| 2021/0350343 A1 | 11/2021 | Gaur et al. |

OTHER PUBLICATIONS

Notice of Reasons for Refusal mailed May 13, 2025 in corresponding Japanese Patent Application No. 2024-535552, with English Translation (8 pages).
First Examination Report mailed Aug. 5, 2025 in corresponding Indian Patent Application No. 202447045937, with English Translation (7 pages).
Notice of Allowance mailed mailed Sep. 9, 2025 in corresponding Japanese Patent Application No. 2024-535552.

\* cited by examiner

METHOD AND SYSTEM FOR ENABLING TRACEABLE PRIVACY-MAINTAINING MULTI-HOP OFFLINE TRANSACTIONS IN DIGITAL CURRENCIES

FIELD

The present disclosure relates to conducting offline transactions for digital currencies, specifically the use of series of cryptographically signed transfer messages, secure connections, and secure data storage to enable transfers of digital currency while offline while maintaining participant privacy.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

However, in a traditional blockchain every transaction must be submitted to a node, verified, and included in a new block that is successfully added to the chain in order for it to be an effective transfer. In order to use newly acquired cryptographic currency, the transferee must wait for the transaction to be posted to the blockchain. Not only can this process be time consuming, but it also requires either party to the transaction to have an active connection to a blockchain node. There can be many cases where two parties wish to make a transfer of cryptographic currency while lacking sufficient connectivity to a blockchain node, i.e., they are offline. In existing blockchain systems, such transfers are impossible.

Thus, there is a need for a technological solution to enable transfers of cryptographic currency to be performed offline without sacrificing the security, immutability, and privacy of a blockchain.

SUMMARY

The present disclosure provides a description of systems and methods for processing offline cryptocurrency transfers. In order to make an offline transfer, a first party must first be issued a certified transfer message by an authorized entity, such as a blockchain node or other permissioned system. The transfer message serves as an authorization for any recipient of the first party's permission to make an offline transfer. Once received, the first party can generate a transfer message for a blockchain transaction for the transfer of cryptographic currency to a second party. This transfer message can be grouped with the first transfer message and electronically transmitted to the second party. The second party can eventually connect to the blockchain network (i.e., go online) to submit the transfer messages, which are then verified, and the offline transaction posted to the blockchain, or can continue to perform offline transfers by generating a new transfer message and transmitting the full group of transfer messages to a third party, who can then connect to the blockchain network or continue the chain of offline transfers. By requiring the full chain of custody of transfer messages, the initial cryptographic currency cannot be used otherwise, and unauthorized spending can be avoided. In some cases, all transfer messages, cryptographic keys, and other data can be stored in a Secure Element or other secure data storage on a computing device to prevent user access, which can maintain privacy of prior offline transactions in the chain and the associated transferors. The result is offline cryptographic currency transfers without sacrificing any of the benefits of existing blockchains.

A method for processing offline cryptocurrency transfers includes: receiving, by a receiver of a computing device, a first transfer message, wherein the first transfer message is cryptographically signed using a first private key of a first key pair; validating, by a processor of the computing device, the cryptographic signature of the first transfer message using a first public key of the first key pair; storing, in a memory of the computing device, the validated first transfer message; receiving, by an input device of the computing device, a transfer instruction, the transfer instruction including at least a communication address; and electronically transmitting, by a transmitter of the computing device, the validated first transfer message to an external device based on at least the communication address.

A system for processing offline cryptocurrency transfers includes: an external device; and a computing device including a receiver receiving a first transfer message, wherein the first transfer message is cryptographically signed using a first private key of a first key pair, a processor validating the cryptographic signature of the first transfer message using a first public key of the first key pair, a memory storing the validated first transfer message, an input device receiving a transfer instruction, the transfer instruction including at least a communication address, and a transmitter electronically transmitting the validated first transfer message to an external device based on at least the communication address.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

System for Processing Offline Cryptocurrency Transfers

Figure 1:
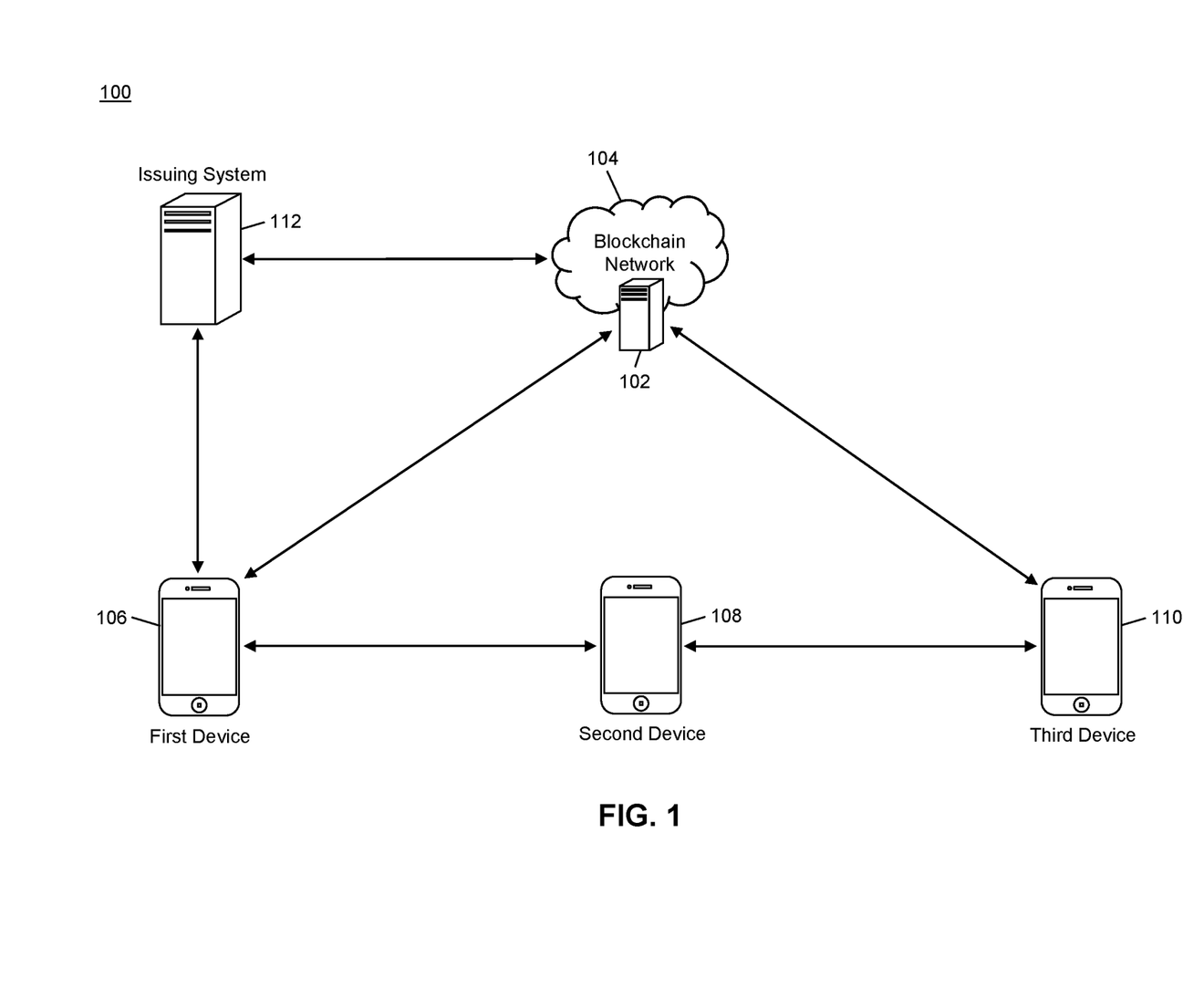
FIG. 1 is a block diagram illustrating a high-level system architecture for processing offline cryptocurrency transfers accordance with exemplary embodiments.

FIG. 1 illustrates a system 100 for processing offline cryptocurrency transfers through the use of a chain of cryptographically signed transfer messages.

As discussed herein, the term "blockchain" can refer to a public ledger of all transactions of a blockchain-based currency, also known as a cryptographic currency. One or more computing devices can comprise a blockchain network, discussed in more detail below, which can be configured to process and record transactions as part of a block in the blockchain. Once a block is completed, the block is added to the blockchain and the transaction record thereby updated. In many instances, the blockchain can be a ledger of transactions in chronological order or can be presented in any other order that can be suitable for use by the blockchain network. In some configurations, transactions recorded in the blockchain can include a destination address and a currency amount, such that the blockchain records how much currency is attributable to a specific address. In some instances, the transactions are financial and others not financial, or might include additional or different information, such as a source address, timestamp, etc. In some embodiments, a blockchain can also or alternatively include nearly any type of data as a form of transaction that is or needs to be placed in a distributed database that maintains a continuously growing list of data records hardened against tampering and revision, even by its operators, and can be confirmed and validated by the blockchain network through proof of work and/or any other suitable verification techniques associated therewith. In some cases, data regarding a given transaction can further include additional data that is not directly part of the transaction appended to transaction data. In some instances, the inclusion of such data in a blockchain can constitute a transaction.

Figure 2:
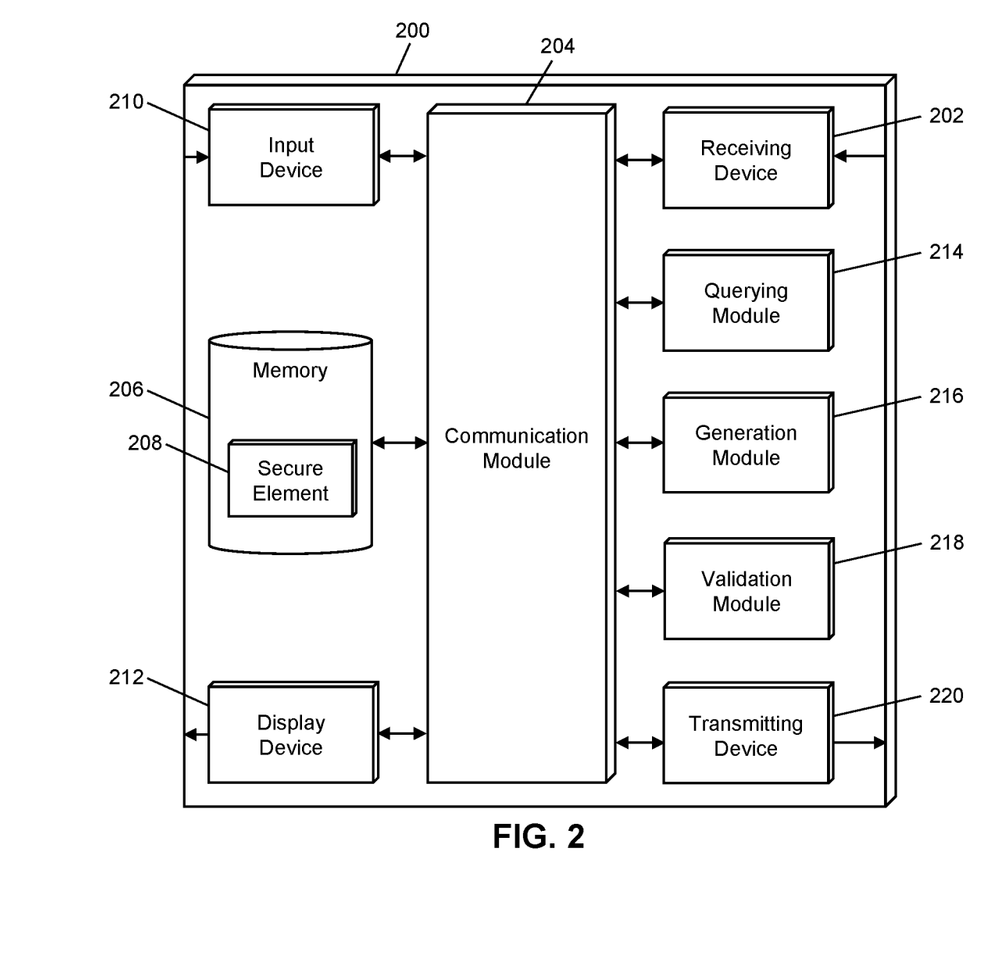
FIG. 2 is a block diagram illustrating a computing device of the system of FIG. 1 for processing offline cryptocurrency transfers in accordance with exemplary embodiments.
Figure 5:
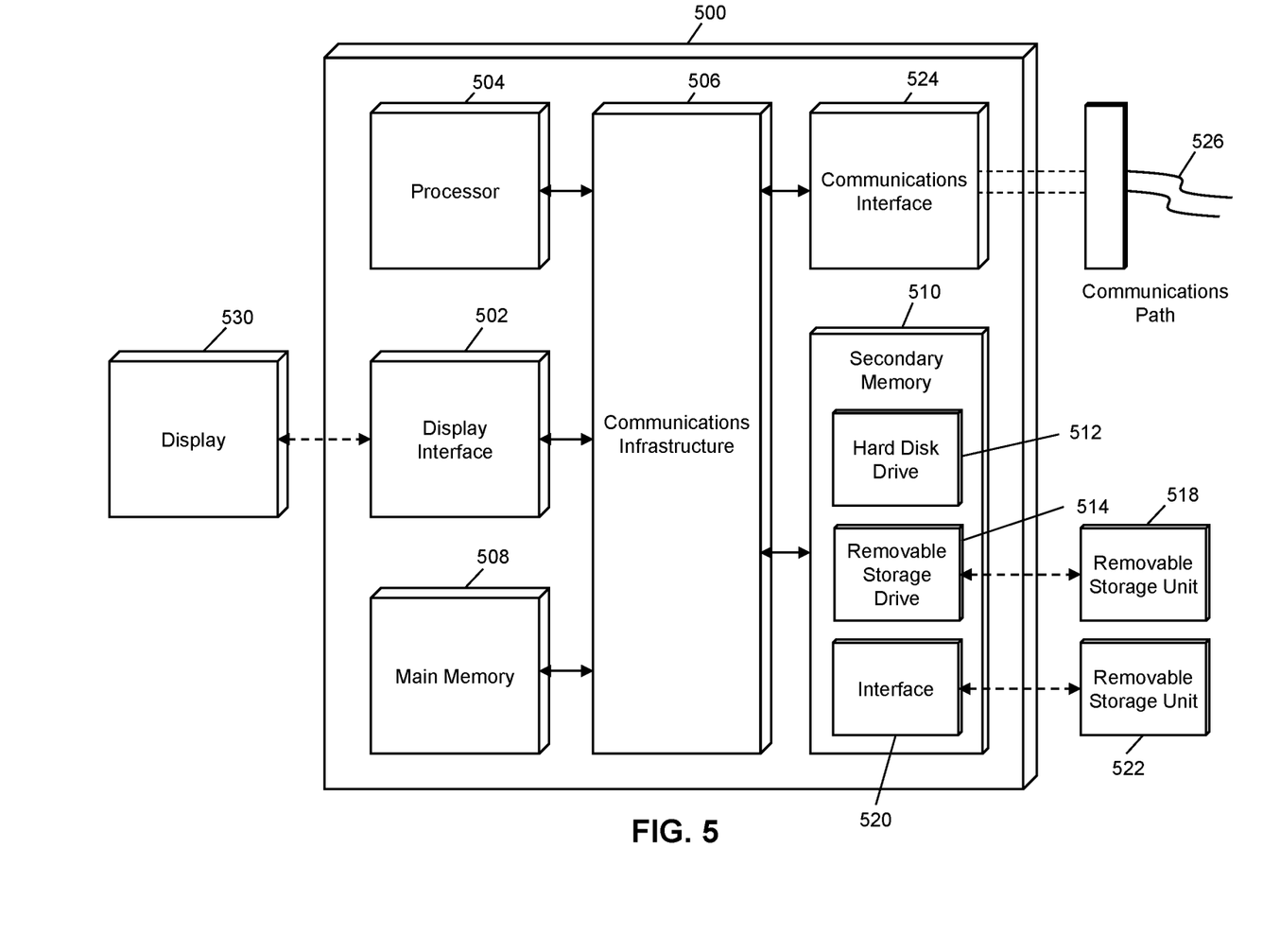
FIG. 5 is a block diagram illustrating a computer system architecture in accordance with exemplary embodiments.

The system 100 can include a blockchain network 104. The blockchain network 104 can be comprised of a plurality of blockchain nodes 102, respectively. Each blockchain node 102 can be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 102 in the blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" can refer specifically to the private key. In other cases, the term "blockchain wallet" can refer to a computing device (e.g., first device 106, second device 108, third device 110, etc.) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a first device 106) that is generated using the sender's private key, a blockchain address of the recipient of currency (e.g., a second device 108) generated using the recipient's public key, and a blockchain currency amount that is transferred, or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 102 in the blockchain network 104, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 104 before being added to the blockchain and distributed to all of the blockchain nodes 102 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, a first device 106 can have a blockchain wallet stored therein that has access to an amount of cryptographic currency on the blockchain associated with the blockchain network 104. As discussed herein, "first device 106," "second device 108", and "third device 110" can each refer to the respective computing devices, users thereof, or the blockchain wallets stored therein interchangeably. The first device 106 can have an interest in making an offline transfer of its cryptographic currency to the second device 108. In order to make an offline transfer, the first device 106 must first be issued a first transfer message, also referred to herein as an issuing transfer message. The issuing transfer message can be a cryptographically signed message that includes a past blockchain transaction for which the cryptographic currency was transferred to the first device 106.

The issuing transfer message can be cryptographically signed by an authorized entity, such as the blockchain node 102. In some embodiments, the system 100 can include additional, permissioned entities that are authorized to cryptographically sign issuing transfer messages, such as an issuing system 112. For example, the blockchain can be a permissioned blockchain among financial institutions where a central bank can be a managing entity and other banks can be participating entities. In such cases, the central bank can cryptographically sign and distribute issuing transfer messages to the other banks for use in making offline cryptographic currency transfers. A cryptographic signature can be generated by using a suitable signature generation algorithm and a private key of a cryptographic key pair. The entity that generates the cryptographic signature (e.g., a blockchain node 102 or issuing system 112) can possess a private key of a cryptographic key pair, referred to herein as an issuing key pair, that is used to generate the cryptographic signatures. The corresponding public key in the issuing key pair can be publicly available to participants in the blockchain network 104, such as the first device 106, second device 108, and third device 110.

The first device 106 can request and receive a cryptographically signed issuing transfer message from the appropriate entity. The first device 106 can validate the cryptographic signature using the public key of the issuing key pair to ensure that the issuing transfer message is valid and will be honored by the blockchain network 104 after an offline transaction is made. Upon successful validation of the issuing transfer message, the first device 106 can be ready to perform an offline transaction.

The first device 106 and second device 108 can agree on a transfer of the cryptographic currency corresponding to the issuing transfer message. The first device 106 can receive input of details for the new blockchain transaction, such as the amount of cryptographic currency to be transferred, and identification of the second device 108 as recipient of the transfer. In some cases, the identification can be a destination blockchain address, which can be generated using a public key of the cryptographic key pair associated with the second device's blockchain wallet. In other cases, the identification can be the public key. The first device 106 can generate a transfer message, referred to herein as a first transfer message, that includes the amount of cryptographic currency, the identification of the second device 108, and a digital signature generated using a private key of the cryptographic key pair associated with the first device's blockchain wallet, which can be generated using any suitable signature generation algorithm. In some cases, the digital signature can be generated using the same signature generation algorithm as used for the cryptographic signature of the issuing transfer message.

Once the first transfer message has been generated, the first device 106 can generate a payment message. The payment message can be a data container that wraps the issuing transfer message with the first transfer message. The first device 106 can then electronically transmit the payment message to the second device 108 using any suitable communication method, such as via Bluetooth, radio frequency, short messaging service, multimedia messaging service, or an application program, such as can be built into the blockchain wallet software. The second device 108 can receive the payment message and can then have control of the transferred cryptographic currency for new offline transfers even before the transfer from the first device 106 to the second device 108 has been published on the blockchain.

If the second device 108 connects to the blockchain network 104 prior to making an additional offline transfer, the second device 108 can electronically transmit the payment message to a blockchain node 102 using a suitable communication network and method. The blockchain node 102 can receive the payment message and can unwrap the data container to obtain the issuing transfer message and first transfer message included therein. The blockchain node 102 can validate the issuing transfer message by validating the cryptographic signature using the issuing public key. If the issuing transfer message is valid, the blockchain node 102 can then validate the transaction included in the first transfer message by validating the digital signature using the public key of the cryptographic key pair associated with the first device's blockchain wallet. If the digital signature is valid, then the transaction can be included in a new block that is generated, validated, and confirmed by the blockchain nodes 102 in the blockchain network 104 and added to the blockchain using traditional methods. The second device 108 can then use the received cryptographic currency in a future, online blockchain transaction, or request a new issuing transfer message for use of the cryptographic currency in a future offline blockchain transaction.

In some cases, when an issuing transfer message has been distributed, the associated cryptographic currency cannot be used in any transaction without presenting the issuing transfer message for proof as in the process discussed above, such as to prevent use of the cryptographic currency in an online transaction while the issuing transfer message is outstanding to prevent double spending of the cryptographic currency. In such cases, the blockchain nodes 102 and/or issuing systems 112 can maintain a record of the distributed issuing transfer messages. In some instances, the blockchain network 104 can require an issuing transfer message for all blockchain transactions, which can negate the need for maintaining a record of distributed issuing transfer messages and still prevent the possibility of double spending of cryptographic currency.

In some embodiments, the first device 106 can be able to connect to the blockchain network 104 and submit the payment message to have the new blockchain transaction added to the blockchain. In such embodiments, the first device 106 can electronically transmit the payment message to a blockchain node 102 and the blockchain node 102 can validate both transfer messages included therein, as discussed above. If the second device 108 submits the same payment message later on, or if the second device 108 had already submitted the payment message prior to the first device's submission, the receiving blockchain node 102 can analyze the blockchain to determine if the transaction associated with the issuing transfer message had already utilized the associated cryptographic currency. If so, the blockchain node 102 can discard the received payment message as the corresponding transaction was already published to the blockchain.

In other embodiments, when the first device 106 electronically transmits the payment message to the second device 108, the first device 106 can automatically delete any local data storage of the payment message, issuing transfer message, and first transfer message.

For the sake of simplicity, blockchain transactions discussed herein are for transfers of the full amount of cryptographic currency associated with a prior blockchain transaction. In cases where not all the cryptographic currency associated with a prior blockchain transaction are transferred (e.g., for the transferor to retain some of the currency), the subsequent blockchain transaction can contain an additional destination address associated with the transferor's blockchain wallet, which would be reflected in the transfer message accordingly.

In some cases, the second device 108 can receive the payment message from the first device 106 and be interested in conducting another offline transfer before connecting to the blockchain network 104. In such cases, the second device 108 can be interested in transferring the received cryptographic currency to a third device 110. In such a case, the second device 108 can receive identification of the third device 110, such as a destination blockchain address or the public key of the cryptographic key pair associated with the third device's blockchain wallet. The second device 108 can generate a transfer message for a new blockchain transaction, referred to herein as a second transfer message. The second transfer message can include the amount of cryptographic currency being transferred, the identification of the third device 110, and a digital signature generated by the second device 108 using the private key of its cryptographic key pair. The second device 108 can add the second transfer message to the payment message, either through inserting the second transfer message in the data container or extracting the issuing transfer message and first transfer message from the payment message and generating a new payment message that includes the issuing transfer message and the first and second transfer messages. The second device 108 can then electronically transmit the payment message to the third device 110 using a suitable communication method.

The third device 110 can receive the payment message from the second device 108 and then continue to transfer the cryptographic currency in future offline transfers or can connect to the blockchain network 104 to have the offline transfers added to the blockchain using the process discussed above. In some cases, the second device 108 can automatically delete the payment message and all local transfer messages after the transmission of the payment message to the third device 110.

In other cases, payment messages can be retained by any of the involved computing devices and electronically transmitted to blockchain nodes 102 in the blockchain network 104. In such cases, when a blockchain node 102 receives a payment message, they can determine if any of the offline transfers indicated in the transfer messages have already been published on the blockchain. For instance, in one example, the second device 108 can make an offline transfer to the third device 110. Later on, the first device 106 can connect to a blockchain node 102 and transmit its payment message, which includes the issuing transfer message and the first transfer message. The blockchain node 102 can determine that the corresponding transaction has not yet published to the blockchain and add the transaction to the blockchain using the process discussed above. The third device 110 can, even later, connect to a blockchain node 102 and transmit its payment message, which includes the issuing transfer message and first transfer message as well as the second transfer message. The blockchain node 102 can validate each of the transfer messages and can determine that the first offline transfer from the first device 106 to the second device 108, corresponding to the first transfer message, was already published to the blockchain but not the second offline transfer. The blockchain node 102 can then add a new transaction to the blockchain corresponding to the second transfer. As a result, cryptographic currency can be continuously transferred via offline transactions with the blockchain updated when any involved device connects to the blockchain network 104.

In some embodiments, the first device 106, second device 108, and third device 110 can utilize a Secure Element or other form of secure data storage for storing cryptographic keys, transfer messages, payment messages, and other data for use in performing the functions discussed herein, such as an application program for the blockchain wallet. A Secure Element or secure data storage can be a data storage, which can be its own separate hardware data store or a delineated section of other data storage that can only be accessed by trusted applications and can be inaccessible to all other applications. In these embodiments, the user can not be allowed to access any data stored in the Secure Element but can utilize data stored therein via a trusted application, such as the blockchain wallet. In such an instance, this can prevent the user (e.g., of the second device 108 or third device 110) from ascertaining any data about previous offline transfers, thus retaining a high level of privacy for all involved entities. Additionally, forced deletion of payment messages or transfer messages can be ensured without user intervention in instances where such processes can be applicable.

In such embodiments, the first device 106, second device 108, and/or third device 110 can communicate with one another using secure communication channels, which may utilize sufficient protocols, encryption, and other techniques sufficient for secure communication. In an example, messages transmitted from the first device 106 to the second device 108 can utilize Transport Layer Security or another suitable type of encrypted channel. In some instances, messages can be transmitted from the secure data storage of the first device 106 directly to the secure data storage of the second device 108 using such a secure communication channel. In such instances, the messages, in addition to the data stored in the secure data storage, would therefore be unavailable to users of the devices.

The methods discussed herein enable the transfer of cryptographic currency offline through the use of signed transfer messages and proper validation by blockchain nodes 102. As a result, entities can transfer cryptographic currency of a blockchain offline without limitation and without sacrificing the accuracy, immutability, and verifiability of a blockchain. Additionally, the use of Secure Elements or other secure data storage on computing devices can maintain a high level of privacy in the offline transfers by making data regarding any previous transfers inaccessible to a user, while still ensuring the accuracy of offline transfers. Thus, the methods and systems discussed herein provide technical improvements over existing blockchain networks 104 and systems.

Computing Device

FIG. 2 illustrates an embodiment of a computing device 200, such can be used as a blockchain node 102, first device 106, second device 108, or third device 110 in the system 100. The embodiment of the computing device 200 illustrated in FIG. 2 is provided as illustration only and cannot be exhaustive to all possible configurations of the computing device 200 suitable for performing the functions as discussed herein. For example, the computer system 500 illustrated in FIG. 5 and discussed in more detail below can be a suitable configuration of the computing device 200.

The computing device 200 can include a receiving device 202. The receiving device 202 can be configured to receive data over one or more networks via one or more network protocols. In some instances, the receiving device 202 can be configured to receive data from blockchain nodes 102, first devices 106, second devices 108, third devices 110, issuing systems 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by blockchain nodes 102, which can be superimposed or otherwise encoded with new blockchain transactions, blockchain transaction validations, confirmation messages, reply messages, new blocks, block reference values, public keys, issuing transfer messages or data related thereto, etc. The receiving device 202 can be configured to receive data signals electronically transmitted by first devices 106, second devices 108, and third devices 110 that can be superimposed or otherwise encoded with payment messages, public keys, destination addresses, or other data as discussed herein. The receiving device 202 can also be configured to receive data signals electronically transmitted by issuing systems 112, which can be superimposed or otherwise encoded with cryptographically signed issuing transfer messages, public keys, or other data as discussed herein.

The computing device 200 can also include a communication module 204. The communication module 204 can be configured to transmit data between modules, engines, databases, memories, and other components of the computing device 200 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing device 200 and external components of the computing device 200, such as externally connected databases, display devices, input devices, etc. The computing device 200 can also include a processing device. The processing device can be configured to perform the functions of the computing device 200 discussed herein. In some embodiments, the processing device can include and/ or be comprised of a plurality of engines and/or modules specially configured to perform one or more functions of the processing device, such as a querying module 214, generation module 216, validation module 218, etc. As used herein, the term "module" can be software or hardware particularly programmed to receive an input, perform one or more processes using the input, and provides an output. The input, output, and processes performed by various modules will be apparent based upon the present disclosure.

The computing device 200 can also include a memory 206. The memory 206 can be configured to store data for use by the computing device 200 in performing the functions discussed herein, such as public and private keys, symmetric keys, etc. The memory 206 can be configured to store data using suitable data formatting methods and schema and can be any suitable type of memory, such as read-only memory, random access memory, etc. The memory 206 can include, for example, encryption keys and algorithms, communication protocols and standards, data formatting standards and protocols, program code for modules and application programs of the processing device, and other data that can be suitable for use by the computing device 200 in the performance of the functions disclosed herein as will be apparent. In some embodiments, the memory 206 can be comprised of or can otherwise include a relational database that utilizes structured query language for the storage, identification, modifying, updating, accessing, etc. of structured data sets stored therein. The memory 206 can be configured to store, for example, cryptographic keys, salts, nonces, communication information for blockchain nodes 102 and blockchain networks 104, address generation and validation algorithms, digital signature generation and validation algorithms, hashing algorithms, transfer message generation rules, payment messages, etc. In some cases, the memory 206 can include a Secure Element 208 or other secure data storage, which can be a part of the memory 206 or separate from the memory 206. The Secure Element 208 can be used to store data used by the computing device 200 in performing the functions discussed herein, such as a blockchain wallet application program, cryptographic keys, transfer messages, and payment messages.

The computing device 200 can also include an input device 210. The input device 210 can be configured to receive input from a user of the computing device 200 or from another source, such as a device interfaced with the computing device 200 via the input device 210, such as a keyboard, mouse, microphone, touch screen, etc. The input device 210 can be required to receive data via this interface, which can be transmitted to another device or component in the computing device 200 via the communication module 204. For example, the input device 210 can be configured to receive input from a user of the computing device 200 via a touch screen selecting a transfer amount of cryptographic currency or selecting another computing device 200 from a list of available computing devices for use in communicating a payment message.

The computing device 200 can also include a display device 212. The display device 212 can be configured to display data to a user of the computing device 200 via any suitable type of display, such as a liquid crystal display, thin film transistor display, light emitting diode display, etc. The display device 212 can receive data from another device or module of the computing device 200, such as via the communication module 204, and can display the data to a user of the computing device 200 via a user interface. For example, the display device 212 can display a user interface for use by a user of the computing device 200 in making selections regarding an offline transfer of cryptographic currency, which can be received via the input device 210.

The computing device 200 can include a querying module 214. The querying module 214 can be configured to execute queries on databases to identify information. The querying module 214 can receive one or more data values or query strings and can execute a query string based thereon on an indicated database, such as the memory 206 of the computing device 200 to identify information stored therein. The querying module 214 can then output the identified information to an appropriate engine or module of the computing device 200 as necessary. The querying module 214 can, for example, execute a query on the Secure Element 208 to identify an issuing public key for use in validating a received issuing transfer message.

The computing device 200 can also include a generation module 216. The generation module 216 can be configured to generate data for use by the computing device 200 in performing the functions discussed herein. The generation module 216 can receive instructions as input, can generate data based on the instructions, and can output the generated data to one or more modules of the computing device 200. For example, the generation module 216 can be configured to generate proposal messages, confirmation messages, digital signatures, data signals, key pairs, block headers, blocks, transfer messages, payment messages, destination addresses, etc.

The computing device 200 can also include a validation module 218. The validation module 218 can be configured to perform validations for the computing device 200 as part of the functions discussed herein. The validation module 218 can receive instructions as input, which can also include data to be used in performing a validation, can perform a validation as requested, and can output a result of the validation to another module or engine of the computing device 200. The validation module 218 can, for example, be configured to validate digital signatures and cryptographic signatures using suitable signature generation algorithms and keys, validate transaction values, validate transfer messages, and other data as discussed herein.

The computing device 200 can also include a transmitting device 220. The transmitting device 220 can be configured to transmit data over one or more networks via one or more network protocols. In some instances, the transmitting device 220 can be configured to transmit data to blockchain nodes 102, first devices 106, second devices 108, third devices 110, issuing systems 112, and other entities via one or more communication methods, local area networks, wireless area networks, cellular communication, Bluetooth, radio frequency, the Internet, etc. In some embodiments, the transmitting device 220 can be comprised of multiple devices, such as different transmitting devices for transmitting data over different networks, such as a first transmitting device for transmitting data over a local area network and a second transmitting device for transmitting data via the Internet. The transmitting device 220 can electronically transmit data signals that have data superimposed that can be parsed by a receiving computing device. In some instances, the transmitting device 220 can include one or more modules for superimposing, encoding, or otherwise formatting data into data signals suitable for transmission.

The transmitting device 220 can be configured to electronically transmit data signals to blockchain nodes 102, which can be superimposed or otherwise encoded with new blockchain transactions, blockchain transaction validations, confirmation messages, reply messages, new blocks, block reference values, public keys, issuing transfer messages or data related thereto, payment messages, etc. The transmitting device 220 can also be configured to electronically transmit data signals to first devices 106, second devices 108, and third devices 110 that can be superimposed or otherwise encoded with transfer messages, payment messages, requests for public keys or destination addresses, etc. The transmitting device 220 can also be configured to electronically transmit data signals to issuing systems 112, which can be superimposed or otherwise encoded with requests for issuing transfer messages, such as can include a public key, digital signature, or other data.

Process for Facilitating Offline Transfers of Cryptographic Currency

Figure 3A:
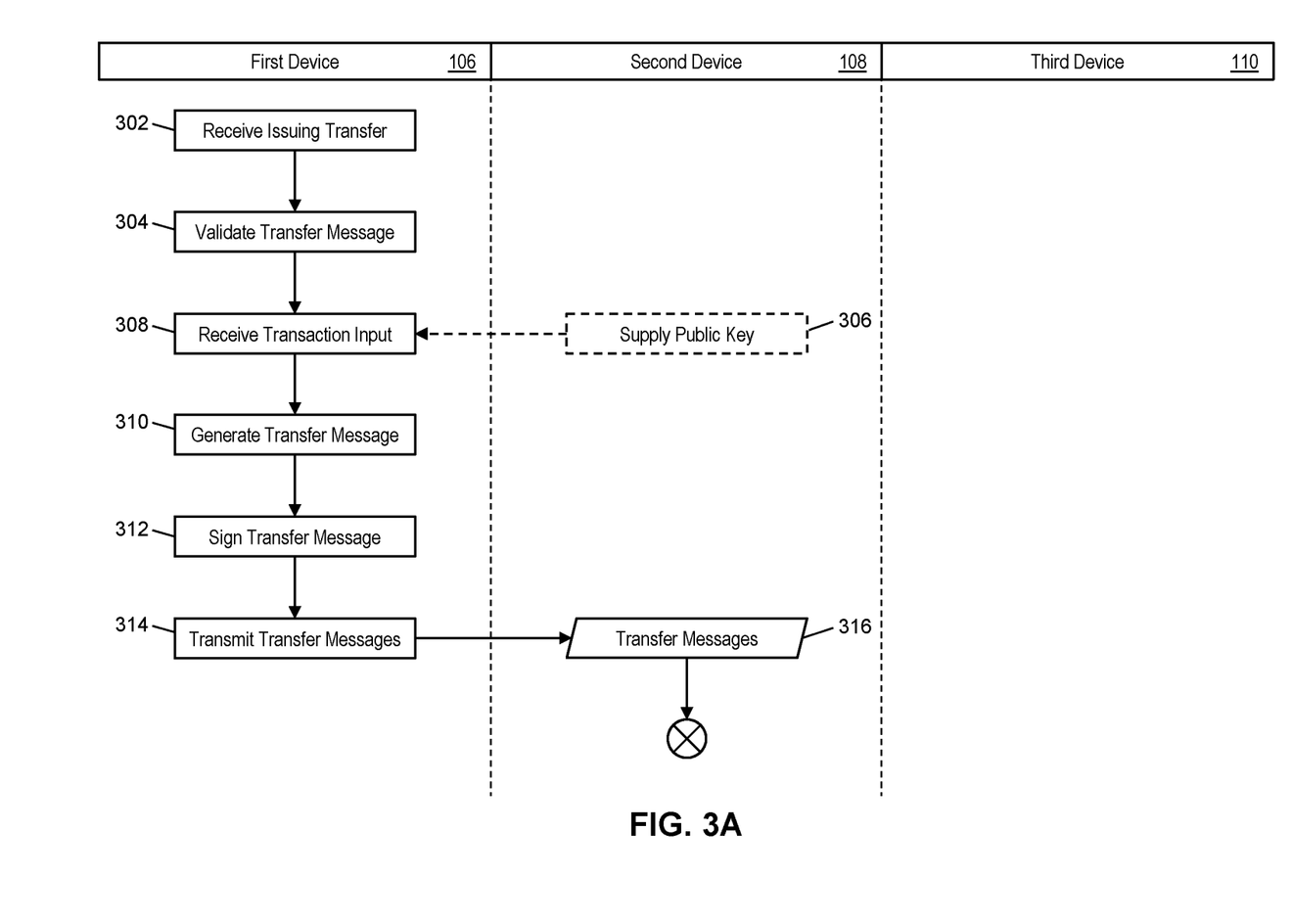
FIGS. 3A and 3B are a flow diagram illustrating a process for processing offline cryptocurrency transfers in accordance with exemplary embodiments.
Figure 3B:
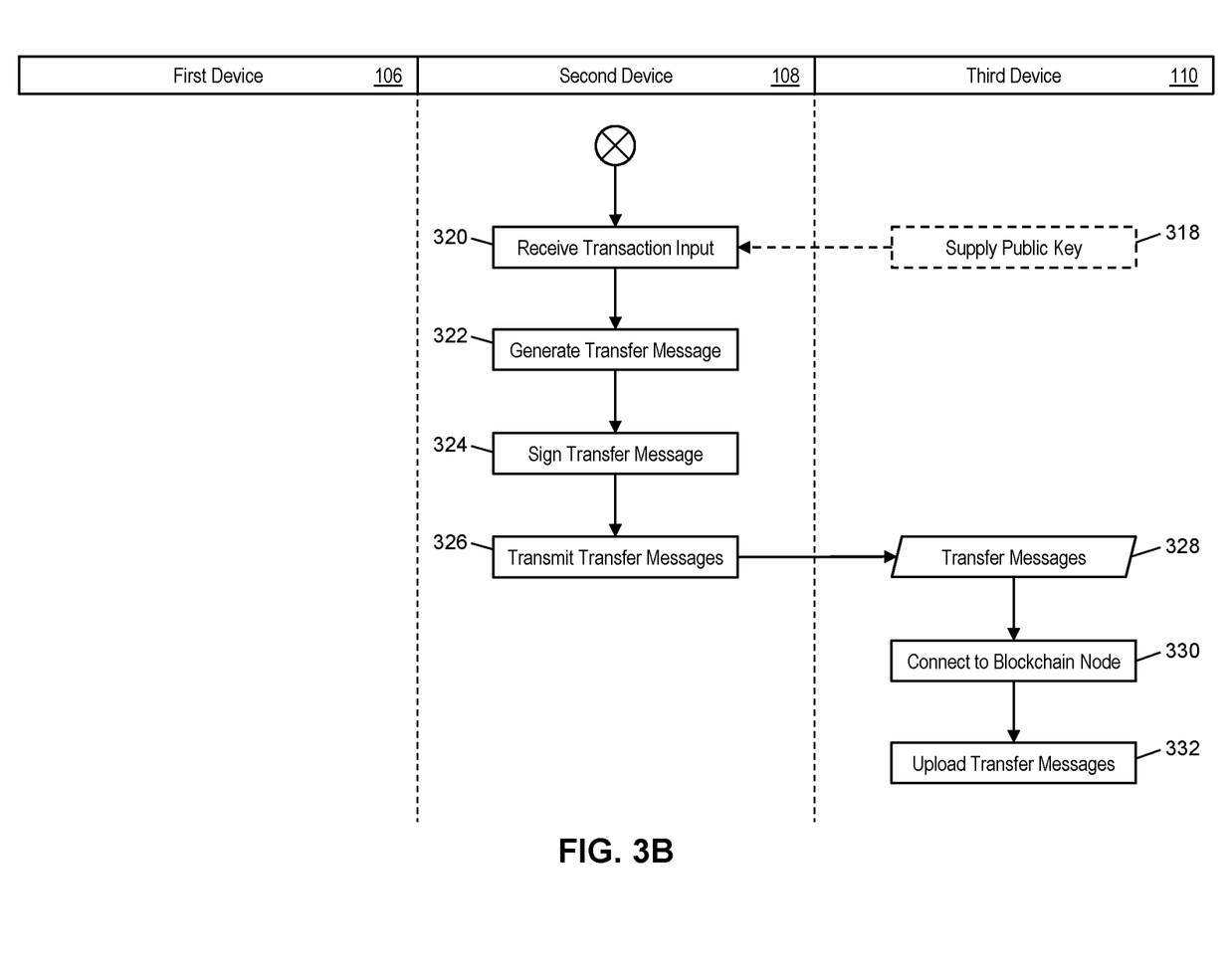

FIGS. 3A and 3B illustrate a process for facilitating an offline transfer of cryptographic currency of a blockchain in the system 100 from the first device 106 to the second device 108 and then to the third device 110.

In step 302, a receiving device 202 of the first device 106 can receive an issuing transfer message from an issuing system 112 or blockchain node 102. The issuing transfer message can be a cryptographically signed transfer message that is associated with a transfer of cryptographic currency to the first device 106 that has already been published to the blockchain associated with the blockchain network 104. In step 304, a validation module 218 of the first device 106 can validate the cryptographic signature of the issuing transfer message via an issuing public key, such as can be stored in a Secure Element 208 of the first device 106. If the validation is successful, the issuing transfer message can be stored in the Secure Element 208 until used by the first device 106.

When a user of the first device 106 is interested in making an offline transfer, the first device 106 can receive data related to the offline transfer as input. In optional step 306, the second device 108 can electronically transmit, via a transmitting device 220, a public key of its cryptographic key pair to the first device 106 using a suitable communication method, which can be received by the receiving device 202 of the first device 106. In step 308, the first device 106 can receive (e.g., via an input device 210 and/or the receiving device 202) input data corresponding to the offline transfer, which can include at least an amount of cryptographic currency, the public key of the second device 108 or other identifier associated therewith generated by the first device 106 or elsewhere if optional step 306 does not occur and the public key of the second device 108 is not received, and an indication that this is an offline transfer related to the received issuing transfer message.

In step 310, a generation module 216 of the first device 106 can generate a first transfer message for the offline transfer. The transfer message can include at least the cryptographic currency amount and the identification associated with the second device 108. In step 312, the generation module 216 of the first device 106 can generate a digital signature for the offline transfer, which can be generated using a private key of the cryptographic key pair of the first device 106 and added to the transfer message or can be a cryptographic signing of the transfer message itself. In step 314, a transmitting device 220 of the first device 106 can electronically transmit the issuing transfer message and the first transfer message to the second device 108 using a suitable communication method. In some cases, the issuing transfer message and first transfer message can first be wrapped in a data container, referred to herein as a payment message, prior to transmission to the second device 108. In some embodiments, the first device 106 can delete the transfer messages from the Secure Element 208 after transmission.

In step 316, a receiving device 202 of the second device 108 can receive the issuing transfer message and first transfer message (e.g., in a payment message) from the first device 106. When a user of the second device 108 is interested in making an offline transfer, the second device 108 can receive data related to the offline transfer as input. In optional step 318, the third device 110 can electronically transmit, via a transmitting device 220, a public key of its cryptographic key pair to the second device 108 using a suitable communication method, which can be received by the receiving device 202 of the second device 108. In step 320, the second device 108 can receive (e.g., via an input device 210 and/or the receiving device 202) input data corresponding to the offline transfer, which can include at least an amount of cryptographic currency, the public key of the third device 110 or other identifier associated therewith generated by the second device 108 or elsewhere if optional step 318 does not occur and the public key of the third device 110 is not received, and an indication that this is an offline transfer related to the received issuing transfer message.

In step 322, a generation module 216 of the second device 108 can generate a first transfer message for the offline transfer. The transfer message can include at least the cryptographic currency amount and the identification associated with the third device 110. In step 324, the generation module 216 of the second device 108 can generate a digital signature for the offline transfer, which can be generated using a private key of the cryptographic key pair of the second device 108 and added to the transfer message or can be a cryptographic signing of the transfer message itself. In step 326, a transmitting device 220 of the second device 108 can electronically transmit the issuing transfer message, the first transfer message, and the second transfer message to the third device 110 using a suitable communication method. In some cases, transfer messages can first be wrapped in a payment message prior to transmission to the third device 110. In some embodiments, the second device 108 can delete the transfer messages from the Secure Element 208 after transmission.

In step 328, the receiving device 202 of the third device 110 can receive the issuing transfer message, first transfer message, and second transfer message (e.g., in a payment message) from the second device 108. In step 330, the third device 110 can establish communication with a blockchain node 102 in the blockchain network 104 using any suitable method. In step 332, a transmitting device 220 of the third device 110 can upload the payment message to the blockchain node 102. The blockchain node 102 can receive the payment message, can validate the transfer messages included therein, and have the offline transfers published to the blockchain as new blockchain transactions. In some embodiments, the third device 110 can delete the payment message from a Secure Element 208 of the third device 110 once the data has been uploaded to the blockchain node 102.

Exemplary Method for Facilitating Offline Cryptographic Currency Transfers

Figure 4:
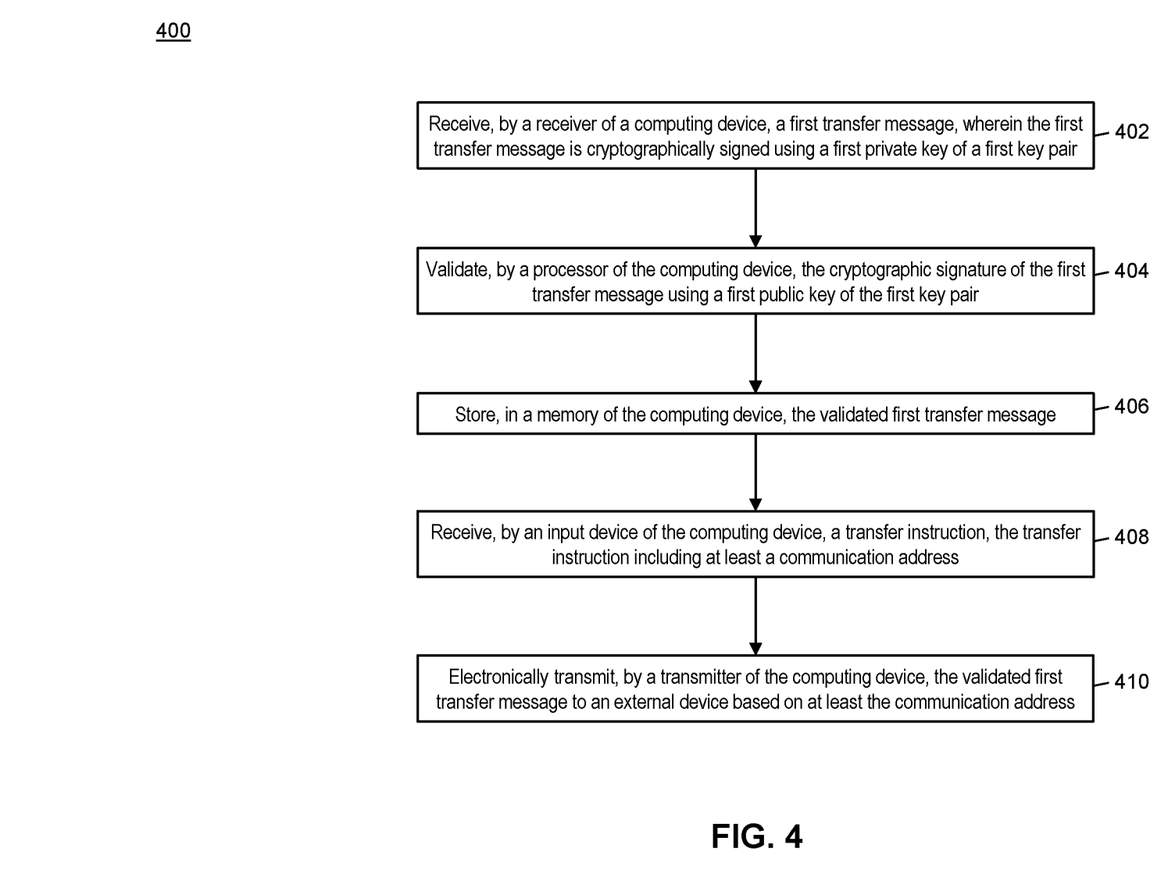
FIG. 4 is a flow chart illustrating an exemplary method for processing offline cryptocurrency transfers in accordance with exemplary embodiments.

FIG. 4 illustrates a method 400 for the processing of offline cryptocurrency transfers through the use of signed transfer messages.

In step 402, a first transfer message can be received by a receiver (e.g., receiving device 202) of a computing device (e.g., computing device 200), wherein the first transfer message is cryptographically signed using a first private key of a first key pair. In step 404, the cryptographic signature of the first transfer message can be validated by a processor (e.g., validation module 218) of the computing device using a first public key of the first key pair. In step 406, the validated first transfer message can be stored in a memory (e.g., memory 206 or Secure Element 208) of the computing device. In step 408, a transfer instruction can be received by an input device (e.g., input device 210) of the computing device, the transfer instruction including at least a communication address. In step 410, the validated first transfer message can be electronically transmitted by a transmitter (e.g., transmitting device 220) of the computing device to an external device (e.g., another computing device 200) based on at least the communication address.

In one embodiment, the memory can be a Secure Element. In some embodiments, the memory can be inaccessible by a user of the computing device. In some embodiments, the method 400 can further include: generating, by the processor (e.g., generation module 216) of the computing device, a second transfer message, wherein the second transfer message includes at least a payment amount, a destination reference, and a reference to the first transfer message, wherein electronically transmitting the validated first transfer message to the external device further includes transmitting the generated second transfer message to the external device. In a further embodiment, the method 400 can also include cryptographically signing, by the processor (e.g., generation module 216) of the computing device, the generated second transfer message using a second private key of a second key pair. In another further embodiment, the destination reference and payment amount can be included in the received transfer instruction. In yet another further embodiment, the destination reference can be a second public key of a second key pair. In an even further embodiment, the method 400 can further include receiving, by the receiver of the computing device, the second public key from the external device.

Computer System Architecture

FIG. 5 illustrates a computer system 500 in which embodiments of the present disclosure, or portions thereof, can be implemented as computer-readable code. For example, the blockchain node 102, first device 106, second device 108, and third device 110, and issuing system 112 of FIG. 1 or the computing device 200 of FIG. 2 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3A, 3B, and 4.

If programmable logic is used, such logic can execute on a commercially available processing platform configured by executable software code to become a specific purpose computer or a special purpose device (e.g., programmable logic array, application-specific integrated circuit, etc.). Embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above-described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general-purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations may be suitable based on the discussion herein. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as suitable. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3A, 3B, and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower-level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower-level language suitable for controlling the computer system 500 to perform the functions disclosed herein. Such processes can result in the computer system 500 being a specially configured computer system 500 uniquely programmed to perform the functions discussed above.

Techniques consistent with the present disclosure provide, among other features, systems and methods for processing offline cryptocurrency transfers. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for processing offline cryptocurrency transfers, comprising:
    storing, in a secure element of a computing device, a first public key of a first key pair;
    communicating, by the computing device, with a blockchain node in a blockchain network, to request a cryptographically signed transfer message;
    receiving, by the computing device, a first transfer message that is cryptographically signed by the blockchain node using a first private key of the first key pair and is associated with a transfer of cryptographic currency;
    validating the cryptographic signature of the first transfer message using the first public key of the first key pair stored in the secure element of the computing device;
    receiving, by the computing device, a transfer instruction, the transfer instruction including at least a communication address;
    generating, by the computing device, a data container by wrapping the first validated first transfer message with a second transfer message; and
    electronically transmitting, by the computing device, the data container to an external device based on at least the communication address.

2. The method of claim 1, further comprising:
    generating, by the computing device, the second transfer message, wherein the second transfer message includes at least a payment amount, a destination reference, and a reference to the first transfer message.

3. The method of claim 2, wherein the destination reference and payment amount are included in the received transfer instruction.

4. The method of claim 2, wherein the destination reference is a second public key of a second key pair.

5. The method of claim 4, further comprising:
    receiving, by the computing device, the second public key from the external device.

6. The method of claim 2, further comprising:
    cryptographically signing, by the computing device, the generated second transfer message using a second private key of a second key pair.

7. The method of claim 1, wherein the data container is a payment message.

8. A system for processing offline cryptocurrency transfers, comprising:
    a blockchain network;
    an external device; and
    a computing device including
        a secure element storing a first public key of a first key pair,
        a transmitter communicating with a blockchain node in the blockchain network to request a cryptographically signed issuing transfer message,
        a receiver receiving, from the blockchain node in the blockchain network, a first transfer message that is cryptographically signed by the blockchain node using a first private key of the first key pair and is associated with a transfer of cryptographic currency,
        a processor validating the cryptographic signature of the first transfer message using the first public key of the first key pair stored in the secure element of the computing device, and
        an input device, wherein
        the memory further stores the validated first transfer message,
        the input device a transfer instruction, the transfer instruction including at least a communication address,
        the processor generates a data container by wrapping the first validated first transfer message with a second transfer message, and
        the transmitter electronically transmits the data container to an external device based on at least the communication address.

9. The system of claim 8, wherein
    the processor of the computing device generates the second transfer message, wherein the second transfer message includes at least a payment amount, a destination reference, and a reference to the first transfer message.

10. The system of claim 9, wherein the destination reference and payment amount are included in the received transfer instruction.

11. The system of claim 9, wherein the destination reference is a second public key of a second key pair.

12. The system of claim 11, wherein the receiver of the computing device receives the second public key from the external device.

13. The system of claim 9, wherein the processor of the computing device cryptographically signs the generated second transfer message using a second private key of a second key pair.

14. The system of claim 8, wherein the data container is a payment message.

\* \* \* \* \*